United States Patent
Hashimoto et al.

(10) Patent No.: US 11,053,831 B2
(45) Date of Patent: Jul. 6, 2021

(54) EXHAUST GAS PURIFICATION APPARATUS FOR AN INTERNAL COMBUSTION ENGINE

(71) Applicant: TOYOTA JIDOSHA KABUSHIKI KAISHA, Aichi-ken (JP)

(72) Inventors: Hiromasa Hashimoto, Susono (JP); Yasushi Iwazaki, Ebina (JP); Shuntaro Okazaki, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/291,692

(22) Filed: Mar. 4, 2019

(65) Prior Publication Data
US 2019/0271250 A1 Sep. 5, 2019

(30) Foreign Application Priority Data
Mar. 5, 2018 (JP) .............................. JP2018-038588

(51) Int. Cl.
*F01N 3/20* (2006.01)
*B01D 53/94* (2006.01)
*F01N 3/10* (2006.01)

(52) U.S. Cl.
CPC ......... *F01N 3/208* (2013.01); *B01D 53/9418* (2013.01); *B01D 53/9445* (2013.01);
(Continued)

(58) Field of Classification Search
CPC .... F01N 3/208; F01N 3/105; F01N 2560/026; F01N 2610/02; B01D 53/9418;
(Continued)

(56) References Cited

U.S. PATENT DOCUMENTS 6,666,020 B2 * 12/2003 Tonetti ................ F02D 41/1448
60/286
6,761,024 B2 7/2004 Uchida
(Continued)

FOREIGN PATENT DOCUMENTS

JP 2003166412 A 6/2003
JP 2005-264808 A 9/2005
(Continued)

OTHER PUBLICATIONS

Unpublished U.S. Appl. No. 16/291,670, filed Mar. 4, 2019.
(Continued)

*Primary Examiner* — David Hamaoui
*Assistant Examiner* — John D Bailey
(74) *Attorney, Agent, or Firm* — Hauptman Ham, LLP

(57) ABSTRACT

An exhaust gas purification apparatus for an internal combustion engine includes a filter supporting the catalyst with an oxygen storage capacity, an air fuel ratio sensor to detect an air fuel ratio of exhaust gas at the downstream side of the filter, and a controller configured to change an air fuel ratio of exhaust gas flowing into the filter, to estimate an amount of particulate matter deposited in an interior of a partition wall of the filter, estimate a maximum storable oxygen amount of the catalyst from a change of the air fuel ratio of exhaust gas obtained by the air fuel ratio sensor at the time when the air fuel ratio of exhaust gas is changed by the controller, and correct the maximum storable oxygen amount of the catalyst based on the amount of particulate matter deposited in the interior of the partition wall of the filter.

5 Claims, 10 Drawing Sheets

(52) U.S. Cl.
CPC ........ *F01N 3/105* (2013.01); *B01D 2255/908* (2013.01); *B01D 2255/9155* (2013.01); *B01D 2258/01* (2013.01); *F01N 2560/026* (2013.01); *F01N 2610/02* (2013.01)

(58) Field of Classification Search
CPC .......... B01D 53/9445; B01D 2255/908; B01D 2255/9155; B01D 2258/01
USPC ........................................................ 701/103
See application file for complete search history.

(56) References Cited

U.S. PATENT DOCUMENTS

| | | | |
|---|---|---|---|
| 6,915,628 B2 | 7/2005 | Kamoto et al. | |
| 7,263,825 B1 | 9/2007 | Wills et al. | |
| 7,698,886 B2* | 4/2010 | Aoki | F01N 11/00 60/277 |
| 8,516,799 B2* | 8/2013 | Hepburn | F01N 3/10 60/286 |
| 9,151,206 B2 | 10/2015 | Van Nieuwstadt | |
| 9,835,069 B2 | 12/2017 | Hagimoto et al. | |
| 10,119,448 B2 | 11/2018 | Kidokoro et al. | |
| 2008/0229730 A1* | 9/2008 | Ishibashi | B01D 53/944 60/277 |
| 2010/0011749 A1* | 1/2010 | Fujiwara | F01N 3/106 60/286 |
| 2012/0000184 A1* | 1/2012 | Ardanese | F01N 11/002 60/274 |
| 2013/0031892 A1* | 2/2013 | Nagaoka | B01D 53/9477 60/274 |
| 2016/0376972 A1* | 12/2016 | Hagimoto | F01N 3/2066 60/276 |
| 2017/0145893 A1* | 5/2017 | Kidokoro | B01D 53/9418 |
| 2017/0152784 A1* | 6/2017 | Kidokoro | G01N 15/0826 |
| 2017/0175605 A1* | 6/2017 | Hagimoto | B01D 53/9418 |
| 2019/0168161 A1 | 6/2019 | Cravillon et al. | |
| 2019/0284977 A1 | 9/2019 | Kaneko et al. | |

FOREIGN PATENT DOCUMENTS

| | | |
|---|---|---|
| JP | 2005264807 A | 9/2005 |
| JP | 2017-96192 A | 6/2017 |
| JP | 2017-96240 A | 6/2017 |
| JP | 2017-96241 A | 6/2017 |
| JP | 2017-110547 A | 6/2017 |
| JP | 2017-110592 A | 6/2017 |
| JP | 2017-110594 A | 6/2017 |
| JP | 2017-110596 A | 6/2017 |
| JP | 2017-115805 A | 6/2017 |
| JP | 2017-115810 A | 6/2017 |

OTHER PUBLICATIONS

Office Action in U.S. Appl. No. 16/291,670, dated Jun. 10, 2020, 24pp.

Office Action in U.S. Appl. No. 16/291,670, dated Nov. 17, 2020, 9pp.

Notice of Allowance in U.S. Appl. No. 16/291,670, dated Jan. 25, 2021, 10pp.

\* cited by examiner

EXHAUST GAS PURIFICATION APPARATUS FOR AN INTERNAL COMBUSTION ENGINE

CROSS REFERENCE TO RELATED APPLICATION

This application claims the benefit of Japanese Patent Application No. 2018-038588, filed on Mar. 5, 2018, which is hereby incorporated by reference herein in its entirety.

BACKGROUND

Technical Field

The present disclosure relates to an exhaust gas purification apparatus for an internal combustion engine.

Description of the Related Art

There has been known that a particulate filter (hereinafter, simply referred to as "a filter") with a catalyst having an oxygen storage capacity supported thereon is arranged in an exhaust passage of an internal combustion engine. When this catalyst deteriorates, a maximum amount of oxygen storable in the catalyst (hereinafter, also referred to as a maximum storable oxygen amount) decreases, as a result of which the deterioration of the catalyst can be determined based on the maximum storable oxygen amount. Here, there has been known a technology in which the maximum storable oxygen amount is corrected based on an amount of particulate matter (hereinafter, also referred to as PM) deposited on the filter, and the temperature of the filter, and the deterioration determination of the filter is made based on the maximum storable oxygen amount after correction (for example, refer to patent literature 1).

At the time of the deterioration determination of the catalyst, the air fuel ratio of exhaust gas flowing into the catalyst is controlled to change from a rich side to a lean side or from a lean side to a rich side across a stoichiometric air fuel ratio. For example, when the air fuel ratio of the exhaust gas flowing into the catalyst changes from an air fuel ratio larger than the stoichiometric air fuel ratio to an air fuel ratio smaller than the stoichiometric air fuel ratio, the oxygen stored in the catalyst is released. Then, while this release of oxygen is carried out, the air fuel ratio of the exhaust gas detected at the downstream side of the catalyst becomes constant in the vicinity of the stoichiometric air fuel ratio. A period of time in which this air fuel ratio of the exhaust gas is in the vicinity of the stoichiometric air fuel ratio relates to the maximum storable oxygen amount in the catalyst, so that the maximum storable oxygen amount can be obtained based on this period of time. However, when the oxygen released from the catalyst is consumed by reacting with the PM deposited on the filter, the period of time in which the air fuel ratio of the exhaust gas detected at the downstream side of the catalyst becomes constant in the vicinity of the stoichiometric air fuel ratio becomes short. In that case, an incorrect determination may be made that the oxygen storage capacity has been low, and hence, in the patent literature 1, a correction to add a storage amount of oxygen to be consumed by the PM to the maximum storable oxygen amount is carried out.

CITATION LIST

Patent Literature

Patent Literature 1: Japanese patent application laid-open publication No. 2005-264808

SUMMARY

In the patent literature 1, there is described a problem that the maximum storable oxygen amount is calculated to be less than an actual amount due to the PM, but it has been newly found that the maximum storable oxygen amount changes according to the deposition location of the PM. Accordingly, when the maximum storable oxygen amount is corrected as in the past, there is a fear that an incorrect determination may occur in the deterioration determination of the catalyst.

The present disclosure has been made in view of the problem as mentioned above, and the object of the disclosure is to estimate an oxygen storage capacity of a catalyst supported by a filter at a high degree of accuracy.

Solution to Problem

In order to solve the above-mentioned problem, according to one aspect of the present disclosure, there is provided an exhaust gas purification apparatus for an internal combustion engine which includes: a particulate filter that is arranged in an exhaust passage of the internal combustion engine, and supports a catalyst having an oxygen storage capacity; an air fuel ratio sensor configured to detect an air fuel ratio of exhaust gas at the downstream side of said particulate filter; and a controller configured to: change an air fuel ratio of exhaust gas flowing into said particulate filter; estimate an amount of particulate matter deposited in an interior of a partition wall of said particulate filter; estimate a maximum storable oxygen amount of said catalyst from a change of the air fuel ratio of exhaust gas obtained by said air fuel ratio sensor at the time when the air fuel ratio of the exhaust gas is changed by said controller; and correct the maximum storable oxygen amount of said catalyst based on the amount of said particulate matter estimated by said controller.

The maximum storable oxygen amount of the catalyst can be obtained based on the change of the air fuel ratio of the exhaust gas at the downstream side of the catalyst at the time when the air fuel ratio of the exhaust gas flowing into the catalyst is made to change. However, it has been found that the maximum storable oxygen amount is influenced according to a location at which the PM is deposited. Also, it has become clear that in the filter supporting the catalyst, the maximum storable oxygen amount changes according to an amount of PM deposited in the interior of the partition wall of the filter (i.e., deposited in the inside or interior of pores formed in the partition wall), but does not change according to an amount of PM deposited on a surface of the partition wall of the filter (i.e., deposited on the outside of the pores formed in the partition wall). Accordingly, even if the degree of deterioration of the catalyst is the same, the maximum storable oxygen amount may change with the location at which the PM is deposited. For this reason, when the deterioration determination of the catalyst is carried out, for example, based on the maximum storable oxygen amount, there is a fear that an incorrect determination may occur. Accordingly, the controller corrects the maximum storable oxygen amount.

The maximum storable oxygen amount changes with the amount of PM deposited in the interior of the partition wall of the filter, so there is a correlation between the amount of PM deposited in the interior of the partition wall of the filter and an amount of change in the maximum storable oxygen amount. For that reason, the controller can correct the maximum storable oxygen amount based on the amount of PM deposited in the interior of the partition wall of the filter. In this manner, by correcting the maximum storable oxygen amount, it can be made hard to be affected by the influence of the amount of PM deposited in the interior of the partition wall of the filter. Accordingly, the oxygen storage capacity of the catalyst can be estimated with a higher degree of accuracy.

In addition, said controller can make an amount of correction at the time of correcting said maximum storable oxygen amount to a decreasing or smaller side larger when the amount of said particulate matter estimated by said controller is large than when it is small.

In cases where the maximum storable oxygen amount changes according to the change of the amount of PM deposited in the interior of the partition wall of the filter, the controller corrects the maximum storable oxygen amount so as to offset the amount of change thereof. With this, the maximum storable oxygen amount in a state where PM has not been deposited in the interior of the partition wall of the filter is obtained. For that reason, for example, when the amount of PM deposited in the interior of the partition wall increases, the maximum storable oxygen amount becomes larger, and so the amount of correction of the maximum storable oxygen amount also becomes larger. Accordingly, the controller makes the amount of correction at the time of correcting the maximum storable oxygen amount to the decreasing or smaller side larger when the amount of PM estimated by said controller is large than when it is small. As a result of this, the oxygen storage capacity of the catalyst can be estimated with a higher degree of accuracy.

According to the present disclosure, an oxygen storage capacity of a catalyst supported by a filter can be estimated with a high degree of accuracy.

DESCRIPTION OF THE EMBODIMENT

Hereinafter, a mode for carrying out the present disclosure will be described in detail by way of example based on a preferred embodiment thereof with reference to the attached drawings. However, the dimensions, materials, shapes, relative arrangements and so on of component parts described in the embodiment are not intended to limit the scope of the present disclosure to these alone in particular as long as there are no specific statements.

Embodiment

Figure 1:
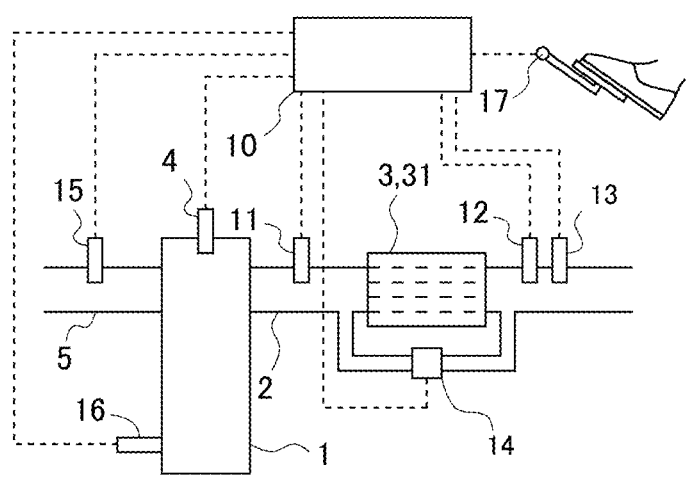
FIG. 1 is a view showing the schematic construction of an intake system and an exhaust system of an internal combustion engine according to an embodiment of the present disclosure.

FIG. 1 is a view showing the schematic construction of an intake system and an exhaust system of an internal combustion engine 1 according to an embodiment of the present disclosure. The internal combustion engine 1 is a gasoline engine for driving a vehicle. However, the internal combustion engine 1 may be a diesel engine. An exhaust passage 2 is connected to the internal combustion engine 1. In the exhaust passage 2, there is arranged a particulate filter 3 (hereinafter, simply referred to as a "filter 3") supporting a three-way catalyst 31. The filter 3 is a wall flow type filter to trap particulate matter (PM) in exhaust gas, wherein when the exhaust gas passes through pores formed in a partition wall of the filter 3, the PM in the exhaust gas is trapped.

The three-way catalyst 31 has an oxygen storage capacity, and serves to purify or remove NOx, HC and CO with a maximum efficiency at the time when a catalytic atmosphere is at a stoichiometric air fuel ratio. The three-way catalyst 31 can maintain the catalytic atmosphere at the stoichiometric air fuel ratio, by storing oxygen when the air fuel ratio of exhaust gas flowing thereinto (or inflow exhaust gas) is a lean air fuel ratio which is an air fuel ratio larger than the stoichiometric air fuel ratio, and releasing oxygen when the air fuel ratio of the inflow exhaust gas is a rich air fuel ratio which is an air fuel ratio smaller than the stoichiometric air fuel ratio. By the action of such an oxygen storage capacity, the three-way catalyst 31 can remove HC, CO and NOx, even if the air fuel ratio of the exhaust gas flowing into the three-way catalyst 31 is other than the stoichiometric air fuel ratio. Here, note that in this embodiment, the three-way catalyst 31 corresponds to a catalyst in the present disclosure. The catalyst in the present disclosure needs only to have the oxygen storage capacity, so a catalyst having an oxygen storage capacity other than the three-way catalyst 31 can also be used.

A first air fuel ratio sensor 11 for detecting the air fuel ratio of exhaust gas is mounted on the exhaust passage 2 at the upstream side of the three-way catalyst 31. In addition, a second air fuel ratio sensor 12 for detecting the air fuel ratio of exhaust gas and a temperature sensor 13 for detecting the temperature of exhaust gas are mounted on the exhaust passage 2 at the downstream side of the three-way catalyst 31. Here, note that the first air fuel ratio sensor 11 and the second air fuel ratio sensor 12 may be limiting current type oxygen concentration sensors, for example, or may be electromotive force type (concentration cell type) oxygen concentration sensors (02 sensors), for example. Each of the limiting current type oxygen concentration sensors outputs a voltage corresponding to an air fuel ratio over a wide air fuel ratio range. On the other hand, each of the electromotive force type (concentration cell type) oxygen concentration sensors outputs a voltage which changes suddenly at the stoichiometric air fuel ratio. Here, note that in this embodiment, the second air fuel ratio sensor 12 corresponds to an air fuel ratio sensor in the present disclosure. Moreover, in the exhaust passage 2, there is arranged a differential pressure sensor 14 which serves to detect a difference between the pressure of exhaust gas at the upstream side of the filter 3 and the pressure of exhaust gas at the downstream side of the filter 3.

In addition, on the internal combustion engine 1, there is mounted a fuel injection valve 4 for each cylinder for injecting fuel into a corresponding cylinder. Moreover, an intake passage 5 is connected to the internal combustion engine 1. An air flow meter 15 for detecting the flow rate of intake air is mounted on the intake passage 5.

Then, an electronic control unit (ECU) 10 is provided in combination with the internal combustion engine 1. The ECU 10 controls the operating state of the internal combustion engine 1, an exhaust gas purification apparatus, and so on. A crank position sensor 16 and an accelerator opening sensor 17, in addition to the first air fuel ratio sensor 11, the second air fuel ratio sensor 12, the differential pressure sensor 14 and the air flow meter 15 as referred to above, are electrically connected to the ECU 10, so that the detected values of these individual sensors are passed or transmitted to the ECU 10.

The ECU 10 is able to grasp the operating state of the internal combustion engine 1, such as the engine rotation speed based on the detection of the crank position sensor 16, the engine load based on the detection of the accelerator opening sensor 17, etc. Here, note that in this embodiment, the air fuel ratio of the exhaust gas flowing into the three-way catalyst 31 is able to be detected by the first air fuel ratio sensor 11, but it is also possible to estimate the air fuel ratio of the exhaust gas based on the amount of intake air detected by the air flow meter 15 and the amount of fuel injected from each injection valve 4. Also, the ECU 10 is able to detect the temperature of the filter 3 and the temperature of the three-way catalyst 31 based on the temperature of the exhaust gas detected by the temperature sensor 13. Here, note that the filter 3 and the three-way catalyst 31 are formed integrally with each other, so the temperature of the filter 3 and the temperature of the three-way catalyst 31 are equal to each other. In addition, the temperature detected by the temperature sensor 13 may also be used as the temperature of the filter 3 and the temperature of the three-way catalyst 31. The ECU 10 is also able to estimate the temperature of the filter 3 and the temperature of the three-way catalyst 31 based on the operating state of the internal combustion engine 1. Moreover, there is a relation between the detected value of the differential pressure sensor 14, and the amount of PM deposition in the filter 3, and hence, the ECU 10 can detect the amount of PM deposition in the filter 3 based on the detected value of the differential pressure sensor 14. The relation between the detected value of the differential pressure sensor 14 and the amount of PM deposition in the filter 3 has been obtained in advance by experiments, simulations, or the like. Here, note that the amount of PM deposition in the filter 3 can also be calculated based on the operating state of the internal combustion engine 1, etc., as will be described later.

Moreover, the ECU 10 carries out a deterioration determination as to whether the three-way catalyst 31 has deteriorated. In cases where a maximum oxygen storage amount of the three-way catalyst 31 becomes lower than a lower limit value, the ECU 10 makes a determination that the three-way catalyst 31 has deteriorated. Here, the deterioration referred to herein is thermal deterioration which can not be recovered, etc. In this embodiment, the maximum storable oxygen amount of the three-way catalyst 31 is obtained by using a Cmax method, and the deterioration determination of the three-way catalyst 31 is carried out by making a comparison between this maximum storable oxygen amount and the lower limit value. Here, the maximum storable oxygen amount of the three-way catalyst 31 is related to a period of time and an air fuel ratio of exhaust gas, from the time when the air fuel ratio of the exhaust gas flowing into the three-way catalyst 31 has changed from a rich air fuel ratio to a lean air fuel ratio until the time when the air fuel ratio of the exhaust gas flowing out of the three-way catalyst 31 changes to a lean air fuel ratio. Similarly, the maximum storable oxygen amount of the three-way catalyst 31 is also related to a period of time and an air fuel ratio of exhaust gas, from the time when the air fuel ratio of the exhaust gas flowing into the three-way catalyst 31 has changed from a lean air fuel ratio to a rich air fuel ratio until the time when the air fuel ratio of the exhaust gas flowing out of the three-way catalyst 31 changes to a rich air fuel ratio. Accordingly, the maximum storable oxygen amount of the three-way catalyst 31 can be calculated based on these periods of time and air fuel ratios.

Figure 2:
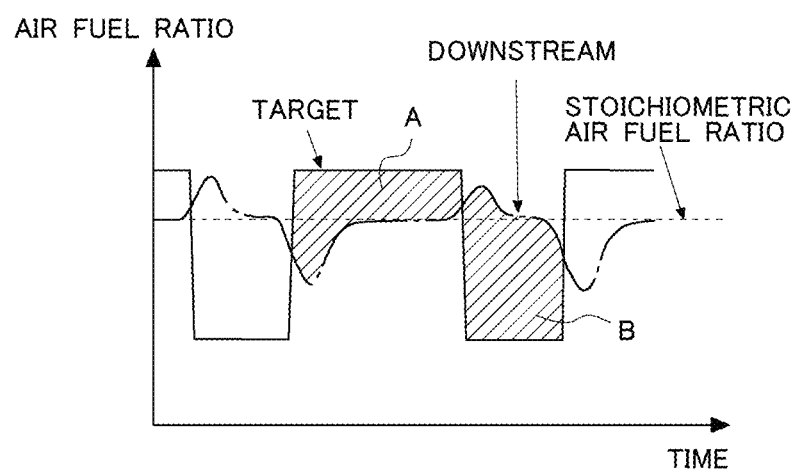
FIG. 2 is a view showing the changes over time of a target air fuel ratio (a solid line) and an air fuel ratio at the downstream side of a three-way catalyst (an alternate long and short dash line).

For example, the maximum storable oxygen amount can be calculated according to the Cmax method, as shown in FIG. 2. FIG. 2 is a view showing the changes over time of a target air fuel ratio (a solid line) and an air fuel ratio at the downstream side of the three-way catalyst 31 (an alternate long and short dash line). The target air fuel ratio is a target air fuel ratio in a cylinder of the internal combustion engine 1. Here, note that the target air fuel ratio may also be replaced with an air fuel ratio of the exhaust gas at the upstream side of the three-way catalyst 31. When the maximum storable oxygen amount is calculated according to the Cmax method, active control is carried out which is to cause the target air fuel ratio to vary across the stoichiometric air fuel ratio. Here, note that in this embodiment, the ECU 10 functions as a controller in the present disclosure, by carrying out the active control. The ECU 10 carries out the active control by executing a program stored in advance in a storage unit (illustration omitted) with which the ECU 10 is provided. In the active control, when the air fuel ratio of the exhaust gas at the downstream side of the three-way catalyst 31, i.e., the air fuel ratio detected by the second air fuel ratio sensor 12, changes from a rich air fuel ratio to a lean air fuel ratio, the target air fuel ratio is switched to a rich air fuel ratio, whereas when the air fuel ratio detected by the second air fuel ratio sensor 12 changes from a lean air fuel ratio to a rich air fuel ratio, the target air fuel ratio is changed to a lean air fuel ratio. The ECU 10 adjusts the amount of fuel injected from each injection valve 4 so that the actual air fuel ratio in each cylinder becomes close to the target air fuel ratio. Here, note that in the case where the second air fuel ratio sensor 12 is an electromotive force type (concentration cell type) oxygen concentration sensor (O2 sensor), the target air fuel ratio is switched from a lean air fuel ratio to a rich air fuel ratio, immediately after the air fuel ratio detected by the second air fuel ratio sensor 12 has changed from a rich air fuel ratio to a lean air fuel ratio. On the other hand, in the case where the second air fuel ratio sensor 12 is a limiting current type oxygen concentration sensor, the target air fuel ratio may be switched at the time when the air fuel ratio detected by the second air fuel ratio sensor 12 becomes a predetermined lean air fuel ratio. That is, even if the detected air fuel ratio becomes a lean air fuel ratio, the target air fuel ratio is not soon switched to a rich air fuel ratio, but the target air fuel ratio may be switched after the detected air fuel ratio has been maintained in a lean air fuel ratio state. This is because even in cases where oxygen is released from the three-way catalyst 31, the air fuel ratio of the exhaust gas flowing out of the three-way catalyst 31 may deviate strictly from the stoichiometric air fuel ratio, and so, in such a case, the air fuel ratio should not be switched.

In FIG. 2, the area of a range (hatched range) surrounded by a line indicating the target air fuel ratio and a line indicating the air fuel ratio at the downstream side of the three-way catalyst 31 is proportional to the maximum storable oxygen amount of the three-way catalyst 31. Accordingly, if the relation between this area and the maximum storable oxygen amount has been obtained in advance through experiments, simulations, or the like, it is possible to obtain the maximum storable oxygen amount based on this area. Based on an area A of the range at the time when the target air fuel ratio is a lean air fuel ratio, the maximum storable oxygen amount may be obtained, or based on an area B of the range at the time when the target air fuel ratio is a rich air fuel ratio, the maximum storable oxygen amount may also be obtained, or based on an average value between the area A at the time when the target air fuel ratio is a lean air fuel ratio and the area B at the time when the target air fuel ratio is a rich air fuel ratio, the maximum storable oxygen amount may also be obtained. In this embodiment, the ECU 10 functions as a controller in the present disclosure by obtaining the maximum storable oxygen amount according to the Cmax method. The ECU 10 estimates the maximum storable oxygen amount by executing a program stored in advance in the storage unit (illustration omitted) with which the ECU 10 is provided. Here, note that in this embodiment, the maximum storable oxygen amount is obtained by using the Cmax method, but instead of this, the maximum storable oxygen amount can be obtained by adopting a well-known technique based on the change of the air fuel ratio of the exhaust gas at the downstream side of the catalyst 31 at the time when the air fuel ratio of the exhaust gas flowing into the catalyst 31 is made to change.

Figure 3:
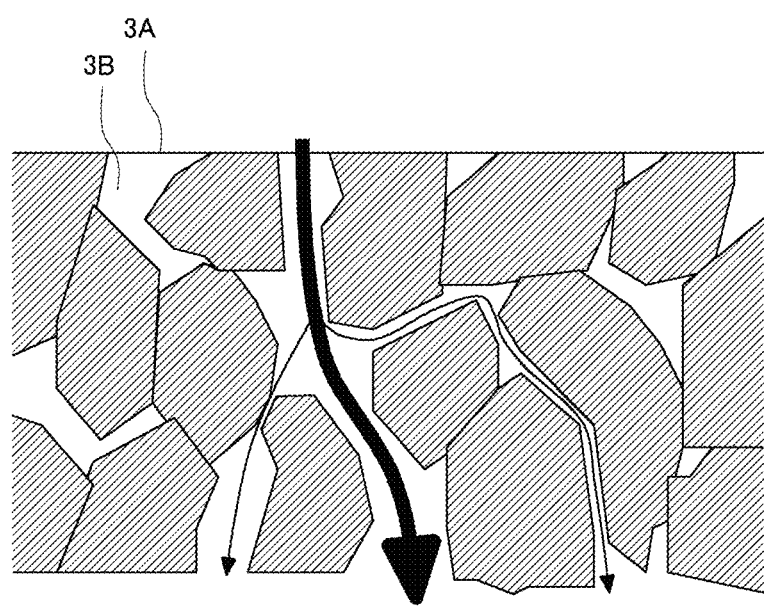
FIG. 3 shows a flow of exhaust gas passing through a filter in cases where PM is not deposited in the filter.
Figure 4:
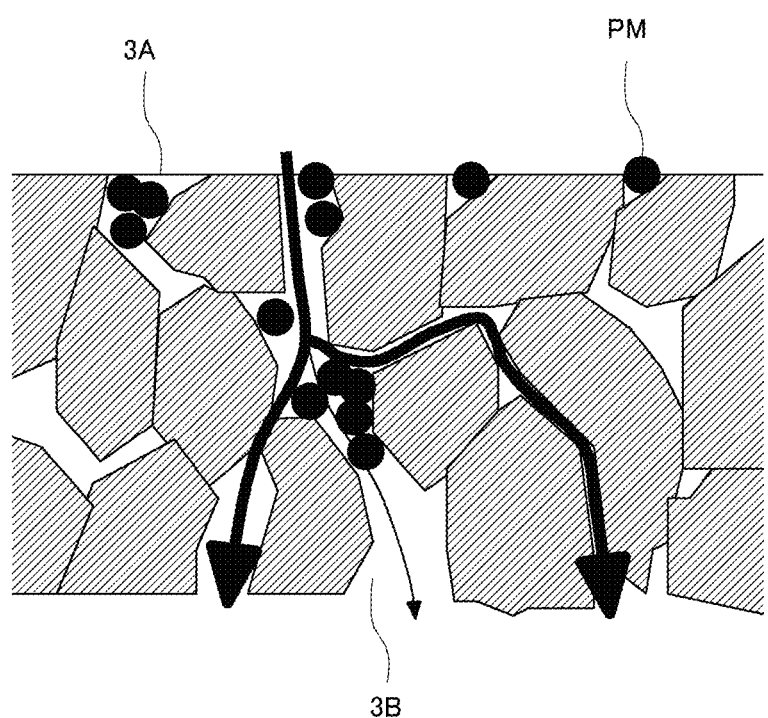
FIG. 4 shows a flow of exhaust gas during the course where PM is being deposited into an interior of a partition wall of the filter.
Figure 5:
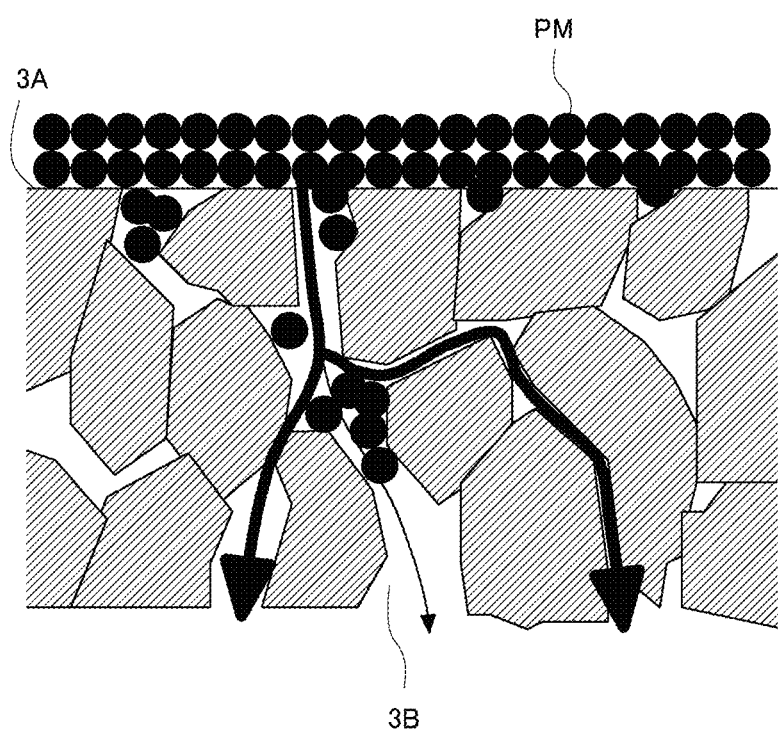
FIG. 5 shows a flow of exhaust gas during the course where PM is being deposited on a surface of the partition wall of the filter after the deposition of the PM into the interior of the partition wall of the filter ends.

The maximum storable oxygen amount obtained in the above-mentioned manner is affected by how PM has deposited in the filter 3. FIG. 3 shows a flow of exhaust gas passing through the filter 3 in the case where PM has not been deposited in the filter 3. FIG. 4 shows a flow of exhaust gas during the course where PM is being deposited in an inside or interior 3B of the partition wall of the filter 3. FIG. 5 shows a flow of exhaust gas during the course where PM is being deposited on a surface 3A of the partition wall of the filter 3 after the deposition of the PM into the interior 3B of the partition wall of the filter 3 ends. In FIG. 3, FIG. 4 and FIG. 5, the flow of an exhaust gas is represented by arrows, and the flow rate of the exhaust gas is represented by the thickness of each arrow. As shown in FIG. 3, in a state where PM has not been deposited in the filter 3, the exhaust gas is easy to pass through the filter 3 at locations at which the diameters of pores are large. In this case, the PM contained in the exhaust gas also flows through the locations where the diameters of pores are relatively large, so the PM is easy to be trapped in these locations where the diameters of pores are relatively large. At this time, oxygen is stored in the locations where the diameters of pores are relatively large.

Then, when the PM is trapped and deposited in the locations where the diameters of pores are relatively large, the exhaust gas become difficult to pass through the locations where the diameters of pores are relatively large, and a larger amount of exhaust gas becomes easy to flow through locations where the diameters of pores are relatively small, as shown in FIG. 4. For that reason, the PM comes to be trapped and deposited in the locations where the diameters of pores are relatively small. At this time, oxygen is stored in the locations where the diameters of pores are relatively small. Here, it has become clear that in cases where the PM is deposited in the filter 3, first of all, the PM is deposited mainly in the interior 3B of the partition wall, as shown in FIG. 4, and thereafter, the PM is deposited mainly on the surface 3A of the partition wall, as shown in FIG. 5. Even if the PM has been deposited on the surface 3A of the partition wall of the filter 3, there have been almost no changes to the flow of the exhaust gas in the interior 3B of the partition wall, as shown in FIG. 5. Accordingly, at this time, oxygen is stored in the locations where the diameters of pores are relatively small.

The PM deposited on the surface 3A of the partition wall and in the interior 3B of the partition wall of the filter 3 is oxidized and removed in a high temperature state (e.g., not less than 500 degrees C.) and in a state where oxygen exists in the exhaust gas. For example, at the time of a high load operation of the internal combustion engine 1, the filter 3 becomes the high temperature state. Then, after that, for example, when fuel cut-off is carried out, or when the internal combustion engine 1 is operated at a lean air fuel ratio, oxygen becomes present in the exhaust gas in a high temperature state, so that the PM deposited in the filter 3 is oxidized. It has become clear that when the PM deposited in the filter 3 is oxidized, first of all, oxidation begins mainly from the PM deposited in the interior 3B of the partition wall, and after the PM deposited in the interior 3B of the partition wall is removed, the PM deposited mainly on the surface 3A of the partition wall is oxidized.

The storage of oxygen into the three-way catalyst 31 is carried out when oxygen contacts storage sites of the three-way catalyst 31. For this reason, when there occurs a state where oxygen contacts a larger number of storage sites, the maximum storable oxygen amount becomes larger. Here, when PM is deposited in the interior 3B of the partition wall of the filter 3 so that the flow of the exhaust gas in the interior 3B of the partition wall changes to pass through the locations in which the diameters of pores are smaller, the exhaust gas will come to flow through the interior 3B of the partition wall in a wider range thereof, and hence, the storage sites in contact with oxygen increase more. Accordingly, the maximum storable oxygen amount increases as the PM is deposited in the interior 3B of the partition wall of the filter 3. Then, when a certain amount of PM is deposited in the interior 3B of the partition wall of the filter 3 so that PM becomes unable to be trapped in the interior 3B of the partition wall, the PM will be deposited on the surface 3A of the partition wall of the filter 3. Even if the PM is deposited on the surface 3A of the partition wall of the filter 3, the flow of the exhaust gas in the interior 3B of the partition wall of the filter 3 does not substantially change, so the number of the storage sites in contact with oxygen does not substantially change, either. Accordingly, even if the amount of PM deposition increases on the surface 3A of the partition wall of the filter 3, the maximum storable oxygen amount does not substantially change.

Further, it has become clear that in cases where the PM deposited in the filter 3 is oxidized, first of all, it is oxidized mainly from the PM deposited in the interior 3B of the partition wall of the filter 3. As the PM is removed from the interior 3B of the partition wall, the exhaust gas comes to flow through those locations in which the diameters of pores are larger, so the opportunity for oxygen to contact the storage sites decreases. For that reason, the maximum storable oxygen amount becomes smaller according to the decreasing amount of PM deposition. In addition, after the PM deposited in the interior 3B of the partition wall of the filter 3 is removed, the PM deposited on the surface 3A of the partition wall is oxidized. Even if the PM deposited on the surface 3A of the partition wall of the filter 3 decreases, there have been almost no changes to the flow of the exhaust gas in the interior 3B of the partition wall of the filter 3, so the maximum storable oxygen amount does not substantially change.

Figure 6:
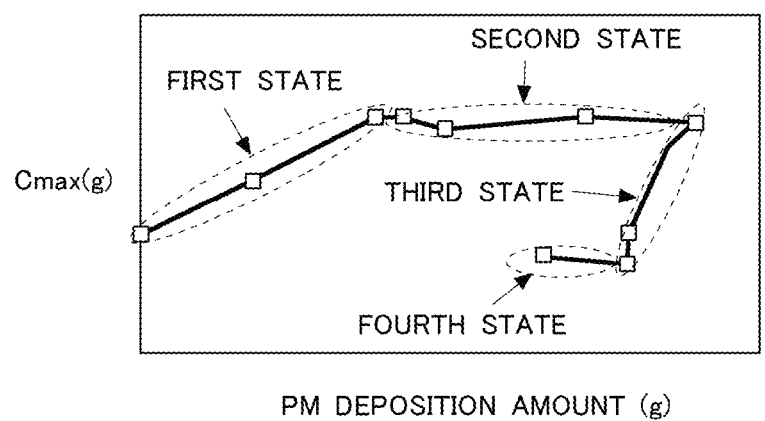
FIG. 6 is a view showing a relation between an amount of PM deposited in the filter and a maximum storable oxygen amount obtained by a Cmax method.

In this manner, the maximum storable oxygen amount may change with the locations in which the PM is deposited in the filter 3. FIG. 6 is a view showing a relation between the amount of PM deposited in the filter 3 and the maximum storable oxygen amount obtained by the Cmax method. A "first state" in FIG. 6 shows a relation between the amount of PM deposition and the maximum storable oxygen amount at the time when PM is in the course of being trapped mainly in the interior 3B of the partition wall of the filter 3, and when the amount of PM deposition in the interior 3B of the partition wall of the filter 3 is in an increasing state. A "second state" in FIG. 6 shows a relation between the amount of PM deposition and the maximum storable oxygen amount at the time when PM is in the course of being trapped mainly on the surface 3A of the partition wall of the filter 3, and when the amount of PM deposition on the surface 3A of the partition wall of the filter 3 is in an increasing state. A "third state" in FIG. 6 shows a relation between the amount of PM deposition and the maximum storable oxygen amount at the time when PM is in the course of being removed mainly from the interior 3B of the partition wall of the filter 3, and when the amount of PM deposition in the interior 3B of the partition wall of the filter 3 is in a decreasing state. A "fourth state" in FIG. 6 shows a relation between the amount of PM deposition and the maximum storable oxygen amount at the time when PM is in the course of being removed mainly from the surface 3A of the partition wall of the filter 3, and when the amount of PM deposition on the surface 3A of the partition wall of the filter 3 is in a decreasing state. As mentioned above, in the first state, the maximum storable oxygen amount increases according to the increasing amount of PM deposition, whereas in the second state, the maximum storable oxygen amount does not substantially change even with an increase in the amount of PM deposition. In addition, in the third state, the maximum storable oxygen amount decreases according to the decreasing amount of PM deposition, whereas in the fourth state, the maximum storable oxygen amount does not substantially change even with a decrease in the amount of PM deposition.

In this manner, the maximum storable oxygen amount obtained by the Cmax method changes with the amount of PM deposition in the interior 3B of the partition wall of the filter 3, so in cases where deterioration of the three-way catalyst 31 is determined based on a comparison between the maximum storable oxygen amount and the lower limit value, there is a fear that an incorrect determination may occur. Accordingly, the ECU 10 corrects the maximum storable oxygen amount obtained by the Cmax method according to the amount of PM deposition in the interior 3B of the partition wall of the filter 3. In this embodiment, such a correction is carried out so that the maximum storable oxygen amount after correction represents the maximum storable oxygen amount in a state where PM is not deposited in the filter 3. Here, note that in this embodiment, the ECU 10 functions as a controller in the present disclosure by correcting the maximum storable oxygen amount. The ECU 10 corrects the maximum storable oxygen amount by executing a program stored in advance in the storage unit (illustration omitted) with which the ECU 10 is provided.

Figure 7:
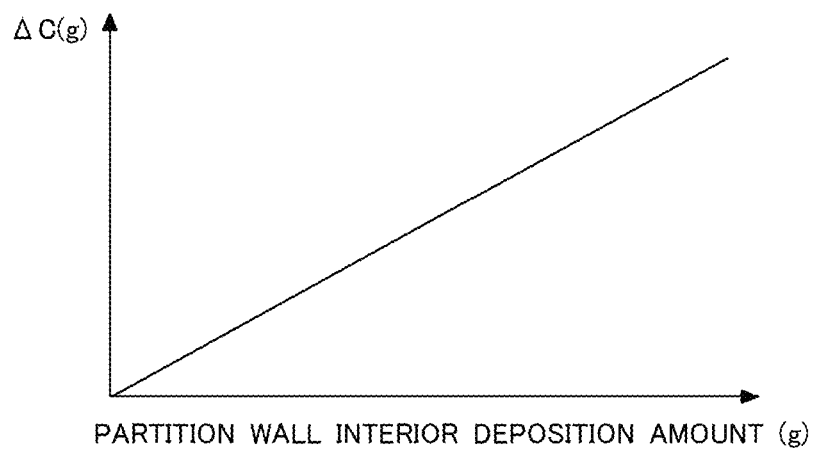
FIG. 7 is a view showing a relation between an amount of PM deposited in the interior of the partition wall of the filter (a partition wall interior deposition amount) and an amount of correction ΔC of the maximum storable oxygen amount.

FIG. 7 is a view showing a relation between the amount of PM deposited in the interior 3B of the partition wall of the filter 3 (hereinafter, also referred to as a partition wall interior deposition amount) and an amount of correction ΔC of the maximum storable oxygen amount. The ECU 10 corrects the maximum storable oxygen amount by subtracting the amount of correction ΔC from the maximum storable oxygen amount obtained by the Cmax method. As the partition wall interior deposition amount increases, the maximum storable oxygen amount increases, so the amount of correction ΔC is set so as to offset such an amount of increase in the maximum storable oxygen amount. For that reason, the amount of correction ΔC becomes larger when the partition wall interior deposition amount is large, than when it is small. The relation shown in FIG. 7 has been obtained and mapped in advance by experiments, simulations or the like, and stored as a correction map in the ECU 10.

Next, a method for estimating the partition wall interior deposition amount will be explained. The partition wall interior deposition amount can be obtained by integrating a value which is obtained by subtracting an amount of PM decreased per unit time by oxidation in the interior 3B of the partition wall of the filter 3 from an amount of PM trapped per unit time in the interior 3B of the partition wall of the filter 3. When PM flows into the filter 3 in a state where PM is not deposited on the filter 3, first of all, the PM flowing into the filter 3 will be trapped in the interior 3B of the partition wall of the filter 3. At this time, an amount of PM flowing into the filter 3 per unit time corresponds to the amount of PM trapped per unit time in the interior 3B of the partition wall of the filter 3. However, there is an upper limit for an amount of PM which can be trapped in the interior 3B of the partition wall of the filter 3. Here, note that in the following, an upper limit of the partition wall interior deposition amount is also referred to as an upper limit partition wall interior deposition amount. When the partition wall interior deposition amount reaches the upper limit partition wall interior deposition amount, the PM thereafter flowing into the filter 3 is deposited on the surface 3A of the partition wall. Accordingly, the amount of PM flowing into the filter 3 per unit time after the partition wall interior deposition amount reaches the upper limit partition wall interior deposition amount corresponds to an amount of PM trapped per unit time on the surface 3A of the partition wall of the filter 3. Here, note that in the following, the amount of the PM deposited on the surface 3A of the partition wall of the filter 3 is also referred to a "surface deposition amount". The amount of PM flowing into the filter 3 per unit time is related to the operating state of the internal combustion engine 1, and hence, the amount of PM flowing into the filter 3 per unit time can be obtained based on the operating state of the internal combustion engine 1. This relation can be obtained in advance through experiments, simulations, or the like.

When regeneration of the filter 3 is carried out, the PM is decreased from the filter 3. An amount of PM decreased per unit time by the regeneration of the filter 3 is related to the temperature of the filter 3 and the operating state of the internal combustion engine 1, and hence, this relation has been obtained in advance through experiments, simulations, or the like. When the regeneration of the filter 3 is carried out, first of all, the partition wall interior deposition amount is decreased. The value obtained by subtracting the amount of PM decreased per unit time by oxidation in the interior 3B of the partition wall of the filter 3 from the amount of PM trapped per unit time in the interior 3B of the partition wall of the filter 3 corresponds to an amount of change per unit time of the partition wall interior deposition amount. At the time of the regeneration of the filter 3, this amount of change becomes a negative value, so the partition wall interior deposition amount decreases. Then, when the partition wall interior deposition amount becomes zero, the PM deposited on the surface 3A of the partition wall of the filter 3 is subsequently oxidized, so the surface deposition amount decreases. A value obtained by subtracting an amount of PM decreased per unit time by oxidation on the surface 3A of the partition wall of the filter 3 from the amount of PM trapped per unit time on the surface 3A of the partition wall of the filter 3 corresponds to an amount of change per unit time of the surface deposition amount. At the time of the regeneration of the filter 3, this amount of change becomes a negative value, so the surface deposition amount decreases. Here, note that in cases where the regeneration of the filter 3 is terminated in the course of the regeneration of the filter 3, the PM remains on the surface 3A of the partition wall of the filter 3. It has been found that although at this time the partition wall interior deposition amount has been smaller than the upper limit partition wall interior deposition amount, the PM flowing into the filter 3 is trapped on the surface 3A of the partition wall of the filter 3, without being trapped in the interior 3B of the partition wall of the filter 3.

Figure 8:
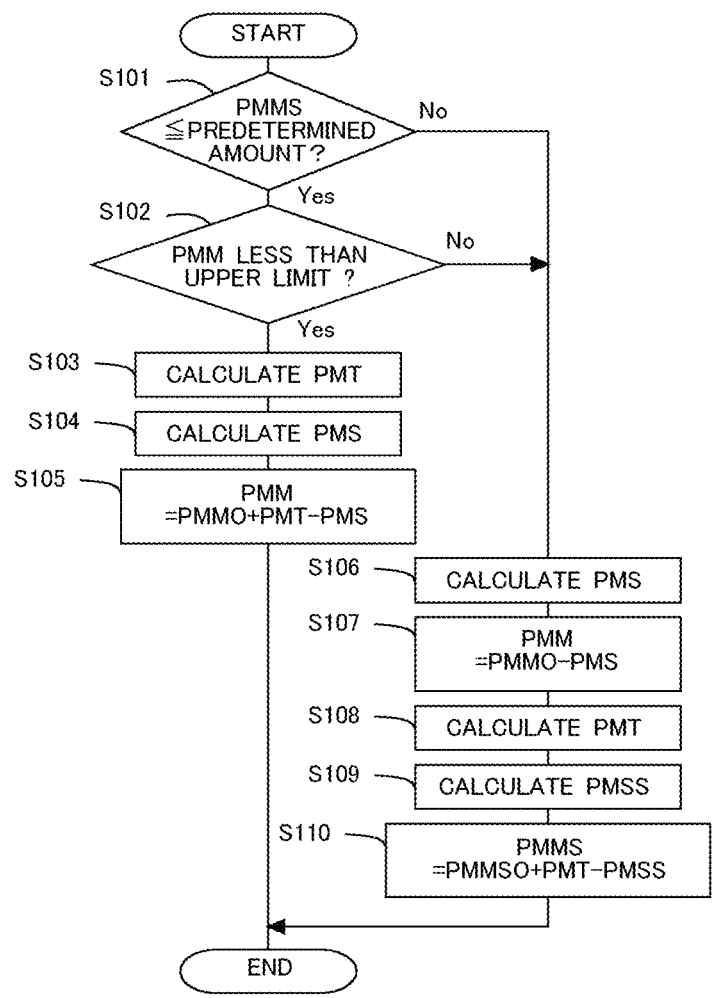
FIG. 8 is a flow chart showing a flow for calculating the partition wall interior deposition amount.

FIG. 8 is a flow chart showing a flow or routine for calculating the partition wall interior deposition amount PMM. This routine in this flow chart is carried out by means of the ECU 10 in predetermined operation intervals. Accordingly, the ECU 10 can grasp the partition wall interior deposition amount PMM as required. In step S101, it is determined whether the surface deposition amount PMMS is equal to or less than a predetermined amount. The predetermined amount is a sufficiently small surface deposition amount in which when PM flows into the filter 3, the partition wall interior deposition amount PMM can be increased. In cases where an affirmative determination is made in step S101, the routine goes to step S102, whereas in cases where a negative determination is made, the routine goes to step S106. In step S102, it is determined whether the partition wall interior deposition amount PMM is less than the upper limit partition wall interior deposition amount. Stated another way, in step S102, it is determined whether PM is able to be trapped in the interior 3B of the partition wall of the filter 3. In cases where an affirmative determination is made in step S102, the routine goes to step S103, whereas in cases where a negative determination is made, the routine goes to step S106.

In step S103, an amount of inflow particulate matter (PM inflow amount) PMT is calculated. The PM inflow amount PMT is a total amount of the PM having flowed into the filter 3 in an operation interval or period. Here, the amount of PM flowing into the filter 3 per unit time is in correlation with the operating state of the internal combustion engine 1 (the engine rotation speed and the engine load). If this correlation has been obtained in advance by experiments, simulations, or the like, the amount of PM flowing into the filter 3 per unit time can be obtained based on the operating state of the internal combustion engine 1. Then, the PM inflow amount PMT can be obtained by integrating the amount of PM flowing into the filter 3 per unit time in the operation period.

The PM flowing into the filter 3 at this time is trapped in the interior 3B of the partition wall of the filter 3.

In step S104, an amount of oxidized particulate (PM oxidation amount) PMS in the interior 3B of the partition wall is calculated. The PM oxidation amount PMS in the interior 3B of the partition wall is a total amount of the PM in the interior 3B of the partition wall of the filter 3 oxidized in the operation period. At this time, the PM has been deposited in the interior 3B of the partition wall of the filter 3, so first of all, the PM in the interior 3B of the partition wall of the filter 3 is oxidized. The amount of the PM oxidized in the interior 3B of the partition wall of the filter 3 per unit time is in correlation with the temperature of the filter 3, the operating state of the internal combustion engine 1, etc. If this correlation has been obtained in advance by experiments, simulations, or the like, the amount of the PM oxidized in the interior 3B of the partition wall of the filter 3 per unit time can be obtained based on the temperature of the filter 3, the operating state of the internal combustion engine 1, etc. Then, the PM oxidation amount PMS in the interior 3B of the partition wall can be obtained by integrating the amount of the PM oxidized in the interior 3B of the partition wall of the filter 3 per unit time in the operation period. Subsequently, in step S105, the partition wall interior deposition amount PMM is calculated by adding the PM inflow amount PMT to the partition wall interior deposition amount PMMO calculated in the last operation period, and subtracting therefrom the PM oxidation amount PMS.

On the other hand, in step S106, the PM oxidation amount PMS in the interior 3B of the partition wall is calculated similarly to step S104. In cases where the PM remains in the interior 3B of the partition wall of the filter 3 though the PM has been deposited on the surface 3A of the partition wall, first of all, the PM in the interior 3B of the partition wall is oxidized, so an amount of the PM thus oxidized is calculated. Here, note that in cases where the PM does not remain in the interior 3B of the partition wall (in cases where the partition wall interior deposition amount PMMO calculated in the last operation period is 0), the PM oxidation amount PMS in the interior 3B of the partition wall becomes 0. Subsequently, in step S107, the partition wall interior deposition amount PMM in the current operation period is calculated by subtracting the PM oxidation amount PMS from the partition wall interior deposition amount PMMO calculated in the last operation period. Here, note that, at this time, the PM has been deposited on the surface 3A of the partition wall of the filter 3, so the PM having flowed into the filter 3 is trapped on the surface 3A of the partition wall of the filter 3, as a result of which there is no amount of increase in the partition wall interior deposition amount PMM.

In step S108, the PM inflow amount PMT is calculated, similarly to step S103. The PM flowing into the filter 3 at this time is trapped on the surface 3A of the partition wall of the filter 3. In step S109, a PM oxidation amount PMSS on the surface 3A of the partition wall of the filter 3 is calculated. Here, note that in cases where the PM remains in the interior 3B of the partition wall, the PM oxidation amount PMSS on the surface 3A of the partition wall of the filter 3 becomes zero. The PM oxidation amount PMSS on the surface 3A of the partition wall is a total amount of the PM oxidized in the operation period on the surface 3A of the partition wall of the filter 3. The amount of the PM oxidized on the surface 3A of the partition wall of the filter 3 per unit time is in correlation with the temperature of the filter 3, the operating state of the internal combustion engine 1, etc. If this correlation has been obtained in advance by experiments, simulations, or the like, the amount of the PM oxidized on the surface 3A of the partition wall of the filter 3 per unit time can be obtained based on the temperature of the filter 3, the operating state of the internal combustion engine 1, etc. Then, the PM oxidation amount PMSS on the surface 3A of the partition wall can be obtained by integrating the amount of the PM oxidized per unit time on the surface 3A of the partition wall of the filter 3 in the operation period. Subsequently, in step S110, the surface deposition amount PMMS is calculated by adding the PM inflow amount PMT to a surface deposition amount PMMSO calculated in the last operation period, and subtracting therefrom the PM oxidation amount PMSS on the surface 3A of the partition wall of the filter 3. In this manner, the surface deposition amount PMMS and the partition wall interior deposition amount PMM can be calculated, respectively.

Here, note that the ECU 10 functions as a controller in the present disclosure, by carrying out the flow chart shown in FIG. 8. In addition, the controller may estimate the partition wall interior deposition amount by using a well-known technique. The ECU 10 estimates the partition wall interior deposition amount by executing a program stored in advance in the storage unit (illustration omitted) with which the ECU 10 is provided. Here, note that in a gasoline engine, an amount of PM discharged from the engine is relatively small. Moreover, in the gasoline engine, the temperature of exhaust gas is high, and hence PM is easily oxidized. For that reason, in the gasoline engine, the PM is not substantially deposited on the surface 3A of the partition wall of the filter 3. In this case, a correlation between a differential pressure detected by the differential pressure sensor 14 and the partition wall interior deposition amount is high. For that reason, the partition wall interior deposition amount can also be estimated based on the differential pressure detected by the differential pressure sensor 14.

Figure 9:
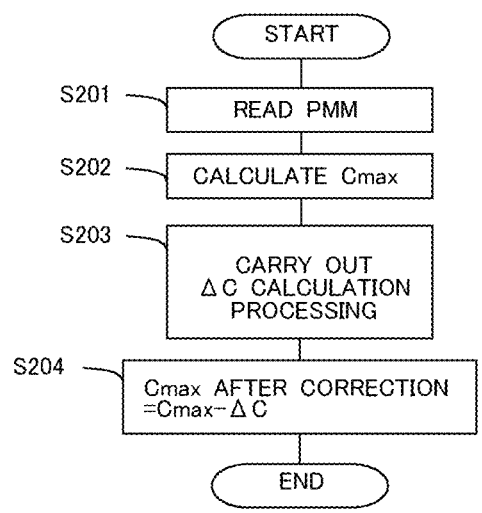
FIG. 9 is a flow chart showing a flow for correcting the maximum storable oxygen amount.

In this manner, the partition wall interior deposition amount at the current point of time can be grasped, and hence, the amount of correction of the maximum storable oxygen amount can be obtained from this partition wall interior deposition amount and the relation shown in FIG. 7. FIG. 9 is a flow chart showing a flow or routine for correcting the maximum storable oxygen amount. The routine in this flow chart is carried out by means of the ECU 10 at each predetermined time interval.

In step S201, the partition wall interior deposition amount PMM is read. The partition wall interior deposition amount PMM is always grasped by the ECU 10. In step S202, the maximum storable oxygen amount Cmax is calculated. The ECU 10 carries out active control and calculates the maximum storable oxygen amount Cmax by the Cmax method. In step S203, processing of calculating the amount of correction ΔC of the maximum storable oxygen amount Cmax is carried out. In this step S203, the ECU 10 calculates the amount of correction ΔC based on the partition wall interior deposition amount PMM read in step S201, and the relation shown in FIG. 7. Then, in step S204, the maximum storable oxygen amount Cmax after correction is calculated by subtracting the amount of correction ΔC calculated in step S203 from the maximum storable oxygen amount Cmax calculated in step S202.

Figure 10:
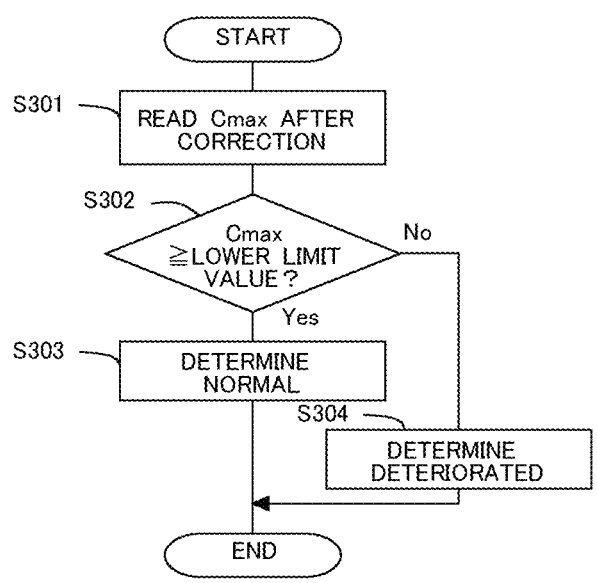
FIG. 10 is a flow chart showing a flow for the deterioration determination of the three-way catalyst.

When the maximum storable oxygen amount Cmax after correction is calculated in step S204 in the flow chart shown in FIG. 9, the ECU 10 carries out the deterioration determination of the three-way catalyst 31 based on the maximum storable oxygen amount Cmax. FIG. 10 is a flow chart showing a flow or routine for the deterioration determination of the three-way catalyst 31. The deterioration determination shown in FIG. 10 is carried out when the maximum storable oxygen amount Cmax after correction is calculated according to the flow chart shown in FIG. 9. In step S301, the maximum storable oxygen amount Cmax after correction is read, and then in step S302, it is determined whether the maximum storable oxygen amount Cmax after correction is equal to or more than the lower limit value. This lower limit value is that of a range of the maximum storable oxygen amount in which the three-way catalyst 31 can be said to be normal in the state where the PM is not deposited in the filter 3, and the lower limit value has been obtained in advance through experiments, simulations or the like. In cases where an affirmative determination is made in step S302, the routine goes to step S303, in which a determination is made that the three-way catalyst 31 is normal. On the other hand, in cases where a negative determination is made in step S302, the routine goes to step S304, in which a determination is made that the catalyst 31 has deteriorated.

As described above, according to this embodiment, the maximum storable oxygen amount is corrected based on the amount of the PM deposited in the interior 3B of the partition wall of the filter 3, so that the oxygen storage capacity of the catalyst supported by the filter 3 can be estimated with a high degree of accuracy. For this reason, at the time of the deterioration determination of the three-way catalyst 31, it is possible to suppress an incorrect determination from being made due to the influence of a PM deposition state. Accordingly, accuracy in the deterioration determination of the catalyst supported by the filter 3 can be improved.

What is claimed is:

1. An exhaust gas purification apparatus for an internal combustion engine, the exhaust gas purification apparatus comprising:
   a particulate filter that is arranged in an exhaust passage of the internal combustion engine, and supports a catalyst having an oxygen storage capacity;
   an air fuel ratio sensor configured to detect an air fuel ratio of exhaust gas at the downstream side of said particulate filter; and
   a controller configured to:
      change an air fuel ratio of exhaust gas flowing into said particulate filter;
      estimate an amount of particulate matter deposited in an interior of a partition wall of said particulate filter;
      estimate a maximum storable oxygen amount of said catalyst from a change of the air fuel ratio of exhaust gas obtained by said air fuel ratio sensor at the time when the air fuel ratio of the exhaust gas is changed by said controller; and
      correct the maximum storable oxygen amount of said catalyst based on the amount of said particulate matter estimated by said controller, wherein a value of the corrected maximum storable oxygen amount is based upon the amount of said particulate matter.

2. The exhaust gas purification apparatus as set forth in claim 1, wherein
   said controller is further configured to:
      determine an amount of correction corresponding to the amount of said particulate matter estimated by said controller, wherein the amount of correction increases as the amount of said particulate matter estimated by said controller increases, and correct said maximum storable oxygen amount by subtracting the amount of correction from the maximum storable oxygen amount estimated by said controller.

3. The exhaust gas purification apparatus as set forth in claim 1, wherein
said controller is further configured to:
determine an amount of correction corresponding to the estimated amount of said particulate matter, and
correct said maximum storable oxygen amount by the determined amount of correction.

4. An exhaust gas purification apparatus for an internal combustion engine, the exhaust gas purification apparatus comprising:
a particulate filter that is arranged in an exhaust passage of the internal combustion engine, and supports a catalyst having an oxygen storage capacity;
an air fuel ratio sensor configured to detect an air fuel ratio of exhaust gas at the downstream side of said particulate filter; and
a controller configured to:
change an air fuel ratio of exhaust gas flowing into said particulate filter;
estimate an amount of particulate matter deposited in an interior of a partition wall of said particulate filter;
estimate a maximum storable oxygen amount of said catalyst from a change of the air fuel ratio of exhaust gas obtained by said air fuel ratio sensor at the time when the air fuel ratio of the exhaust gas is changed by said controller; and
correct the maximum storable oxygen amount of said catalyst based on the amount of said particulate matter estimated by said controller
wherein
in response to PMMS being not greater than a predetermined amount, and
PMM being less than an upper limit,
said controller is configured to calculate $$PMM = PMMO + PMT - PMS,$$

where
PMMS is an amount of said particulate matter deposited on a surface of the partition wall of said particulate filter,
PMM is the amount of said PM particulate matter deposited in the interior of the partition wall of said particulate filter,
PMMO is PMM calculated in a last operation period,
PMT is a total amount of said particulate matter flowing into said particulate filter in an operation period, and
PMS is an amount of said particulate matter oxidized in the interior of the partition wall of said particulate filter in the operation period.

5. The exhaust gas purification apparatus as set forth in claim 4, wherein
in response to either
PMMS being greater than the predetermined amount, or
PMM being not less than the upper limit,
said controller is configured to calculate $$PMM = PMMO - PMS, \text{ and}$$

$$PMMS = PMMSO + PMT - PMSS$$

where
PMMSO is PMMS calculated in the last operation period, and
PMSS is an amount of said particulate matter oxidized on the surface of the partition wall of said particulate filter.

* * * * *